FLUX RESPONSIVE MAGNETIC REPRODUCER HEAD

Filed Jan. 19, 1956

INVENTOR.
OTTO KORNEI
BY
William J. Flynn
ATTORNEY

INVENTOR.
OTTO KORNEI
BY
William J. Flynn
ATTORNEY

INVENTOR.
OTTO KORNEI
BY
William J. Flynn
ATTORNEY

FLUX RESPONSIVE MAGNETIC REPRODUCER HEAD

Filed Jan. 19, 1956 4 Sheets-Sheet 4

*INVENTOR.*
OTTO KORNEI
*BY*
William J. Flynn
ATTORNEY 2,905,770
Patented Sept. 22, 1959

2,905,770

FLUX RESPONSIVE MAGNETIC REPRODUCER HEAD

Otto Kornei, Poughkeepsie, N.Y., assignor to Clevite Corporation, Cleveland, Ohio, a corporation of Ohio Application January 19, 1956, Serial No. 560,164

21 Claims. (Cl. 179—100.2)

This invention relates to flux responsive magnetic reproducer heads and to a method of reproducing a uniform magnetization signal which has been longitudinally recorded.

The most common practice in reproducing magnetically recorded signals depends upon the movement of a magnetized tape, wire, drum, or other magnetic record medium past a magnetic reproducer head, which reproduces the recorded signal in response to such movement of the record medium. Systems of this type are universally employed in reproducing magnetic sound recordings. In systems of this type, when the relative motion between the record medium and the reproducer head ceases, the reproducer head will cease to reproduce the recorded signals because such reproduction depends upon the change of the flux induced in the core of the reproducer head by the magnetic signal at the increment of the record medium bridging the gap of the reproducer head. This change of flux depends upon relative movement between the record medium and the reproducer head.

For certain applications of increasing importance, such as in low frequency measurements, industrial controls, computers, and other magnetic memory devices, it is desired to reproduce a magnetically recorded signal such that the signal reproduction does not depend upon relative movement between the record medium and the reproducing head. This would enable the reproduction of a magnetically recorded signal while the record medium and the reproducing head are stationary relative to one another, thereby adapting the magnetic reproducing technique to use with an intermittently or very slowly moving magnetic record medium.

For this purpose, it has been suggested heretofore to provide a flux responsive magnetic reproduce head and various heads of this general type have been proposed. A flux responsive head may be defined as one which produces an electrical output signal which is an accurate facsimile of the magnetic flux pattern of the signal recorded on the magnetic record medium. In contrast, conventional magnetic reproducer heads, by the very principle of their operation, produce a signal proportional to the time derivative of the recorded flux pattern. This, of course, alters the phase and wave shape of the recorded signal and in numerous applications this distortion is objectionable.

While various types of flux responsive magnetic reproducer heads have been proposed for the purpose of reproducing magnetically recorded signals independent of relative movement between the record medium and the reproducing head, the heads previously proposed for this purpose have been characterized by their complexity and comparatively poor sensitivity.

Also, it is generally characteristic of previous flux responsive heads, as well as of conventional magnetic reproducer heads, that they are not capable of reproducing a longitudinally recorded signal of infinitely long wave length, that is, which is of uniform magnetization along its length, commonly termed a "D.C. signal." This inability is due to the fact that previous flux responsive heads, as well as conventional magnetic reproducer heads generally, depend upon a magnetomotive potential difference across the reproducing gap of the head. A longitudinally recorded signal of infinitely long wave length establishes a uniform and gradient-free magnetic flux in the record medium at the opposite sides of the reproducing gap of the reproducer head, so that no flux is induced in the core of the head by such a recorded signal, whether the record medium is moving or stationary. Of the various magnetic recording techniques, longitudinal recording has been the most extensively used and should continue to be so, especially because of its superiority to other techniques in recording a maximum of signal information in a given space on the record medium. Therefore, the problem of providing a magnetic reproducer head which will satisfactorily reproduce a uniform magnetization signal which has been recorded magnetically by the longitudinal recording technique is of very considerable practical importance.

Accordignly, an extremely important aspect of the present invention is the provision of a novel method of reproducing a longitudinally recorded signal of infinitely long wave length and a novel magnetic reproducer head capable of reproducing such a magnetically recorded signal.

It is an object of this invention to provide a novel and improved flux responsive magnetic reproducer head.

It is also an object of the present invention to provide a novel flux responsive magnetic reproducer head of improved sensitivity.

Another object of this invention is to provide a novel flux responsive magnetic reproducer head characterized by a structurally simple and relatively inexpensive physically modification of conventional magnetic reproducer heads.

A further specific object of this invention is to provide a novel and improved unitary multichannel flux responsive magnetic reproducer head unit.

It is an additional object of the present invention to provide a novel method of reproducing a magnetically recorded signal of infinitely long wave length.

Also, it is an object of this invention to provide a novel magnetic reproducer head capable of reproducing a uniform magnetization longitudinally recorded signal.

For the purpose of illustrating the principles and advantages of the present invention, there are shown in the accompanying drawings and described in detail in the following description several embodiments of this invention. However, it is to be understood that the present invention is susceptible of various other embodiments and that this invention is not limited to the precise arrangements shown and described herein.

Figures 1, 2:
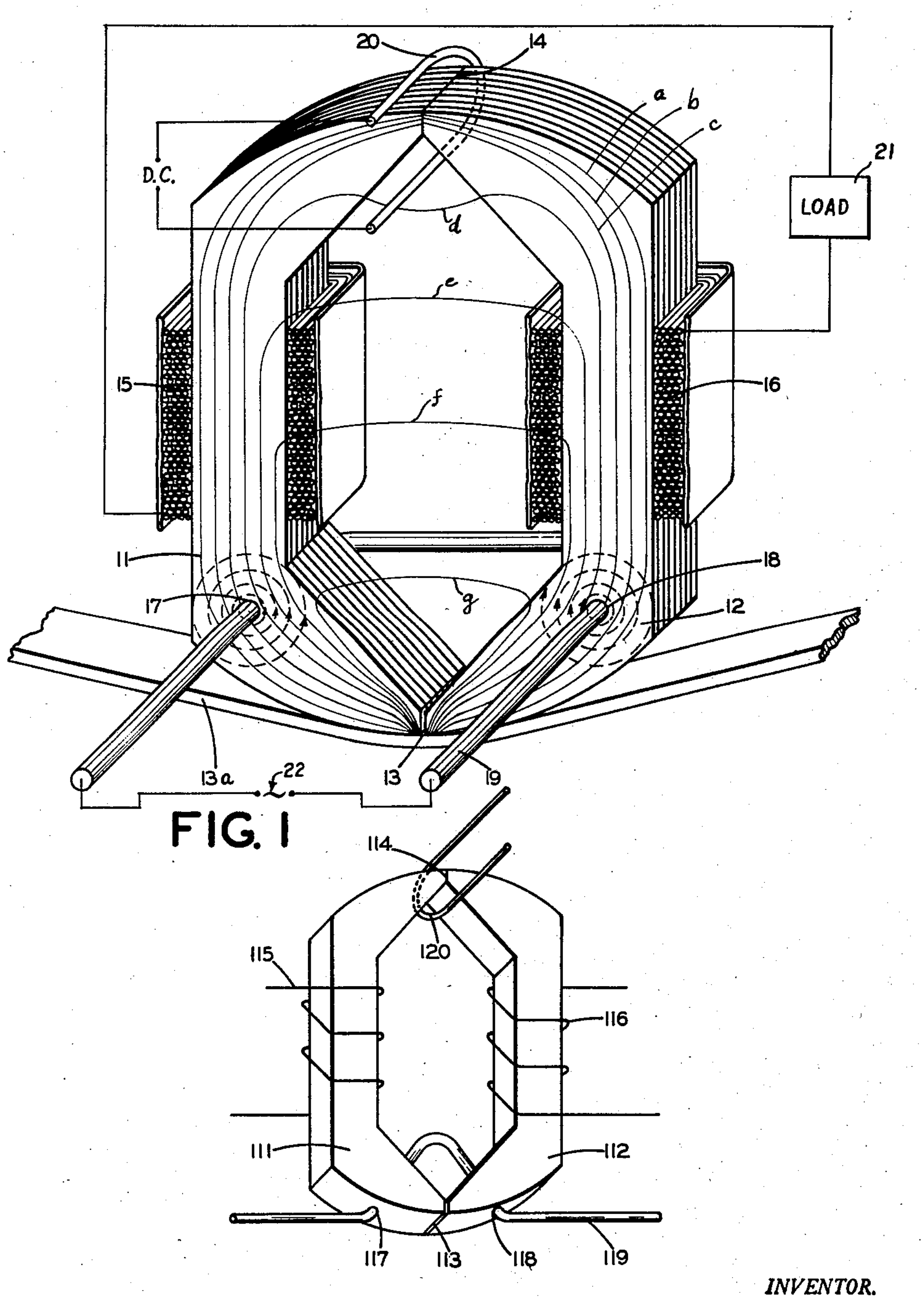
Figure 1 represents a schematic perspective view of a preferred embodiment of a single channel flux responsive head in accordance with the present invention.
Figure 2 is a schematic perspective view showing a second embodiment of a single channel flux responsive head according to this invention.

Referring to Fig. 1, in the preferred embodiment of the present flux responsive reproducer head there is provided a substantially closed magnetic ring core consisting of two opposed confronting core legs 11 and 12 which at one end present pole tips defining a narrow reproducing or playback gap 13. In the illustrated embodiment the core legs are of high permeability ferromagnetic material and preferably are of laminated construction. Alternatively, the core legs may be of essentially electrically non-conductive magnetic material, such as ferrite, particularly where the signals to be reproduced or the excitation signal are of relatively high frequency. In use the head is positioned with its playback gap immediately contiguous to the record track on the magnetic record medium 13*a*. Preferably, this gap is filled with non-magnetic material, such as aluminum or bronze foil, to more precisely define the length of the gap and to prevent the gap from becoming clogged with magnetic powder from the record medium. In a typical case the gap length may be within the range from about .00025 to .0005 inch. At their opposite ends the core legs 11 and 12 are secured together at a butt joint 14, which is positioned directly opposite the reproducing gap 13. The respective core legs carry output coils 15 and 16, respectively, which are wound around the core legs in spaced relation to the reproducing gap 13, as shown in Fig. 1. These output coils are connected in series with each other across an output load 21. Thus far, the magnetic head structure is conventional.

In accordance with this embodiment of the present invention there are formed in the respective head core legs 11 and 12 holes 17 and 18, respectively, each of which is located between the reproducing gap 13 and the output coil on that particular core leg. An excitation conductor in the form of a single wire 19 extends through the hole 18 in core leg 12 and makes a single loop back through the hole 17 in core leg 11. In this embodiment, the excitation conductor 19 intersects each core leg perpendicular to the core leg (that is, the length of the excitation conductor extends perpendicular to a plane longitudinally through the core leg). The opposite ends of the excitation conductor 19 are connected to a suitable A.C. excitation source 22 or to an interrupted D.C. source. The excitation signal applied to conductor 19 should be of a frequency several times the highest signal frequency to be reproduced from the record medium. The connection of the excitation source 22 to excitation conductor 19 is entirely separate from the output coils 15, 16, so that the amplitude and frequency of the excitation current applied to conductor 19 are independent of the output signal appearing across the output coils 15 and 16.

Each of the holes 17 and 18 is located at substantially a magnetic center in each respective head core leg, that is, magnetically symmetrical with respect to the magnetic signal flux (shown in full lines in Fig. 1) which flows through that core leg from one side of gap 13 to the other side of gap 13. This signal flux is induced in the head core by the recorded signal on the record medium contiguous to the reproducing gap. It is to be noted that the excitation conductor 19 intersects both core legs perpendicular to this signal flux.

In the operation of this device, excitation current through the excitation conductor 19 induces changing magnetic excitation flux (dotted lines in Fig. 1) in each core leg 11 and 12 around the intersection of the excitation conductor therewith. The permeability of each of the ferromagnetic core legs 11 and 12 changes with its magnetization, this permeability approaching unity for magnetization approaching saturation. The amplitude of the excitation signal applied to excitation conductor 19 is of such a value that the excitation flux (dotted line in Fig. 1) substantially magnetically saturates each core leg periodically. As a result of the changing excitation flux induced in the portion of each core leg around the excitation conductor 19 by the excitation current, the permeability of each core leg between the reproducing gap and the respective output coil changes substantially in periodic fashion (at twice the frequency of the excitation signal in the case of A.C. excitation). Because of this, the magnetic reluctance of each core leg changes substantially with the excitation signal, thereby causing a corresponding substantial change of any steady signal flux passing through these core legs. Due to this action, there is generated in each output coil a voltage which has an amplitude proportional to the instantaneous steady signal flux passing through the core legs which, in turn, is proportional to the strength of the magnetic signal on the record medium at the playback gap 13, and a frequency depending upon the frequency of the excitation signal applied to the excitation conductor 19. This voltage is generated independent of any relative movement between the magnetic record medium and the reproducer head.

The changing excitation flux induced in the core legs by the excitation current does not appear across the reproducing gap to distort or erase the output signal because of the previously described intersection of the excitation conductor at a magnetic center of each core leg. This location causes the excitation flux to close within the core leg in substantially concentric lines directly surrounding the conductor. This situation, in turn, results in a balance of excitation flux flowing with and against the signal flux, thus keeping the excitation flux from closing through the gap of the core structure.

The particular location between the playback gap and the signal windings of the intersections of the excitation conductor with the core legs is of great importance to the efficient operation of the flux responsive head of the present invention. Clearly, only that portion of the signal flux can be utilized for the generation of a signal voltage which is modulated by the influence of the excitation flux and which, at the same time, interlinks with the signal windings. It is evident from Fig. 1 that the total available signal flux which enters and leaves the core structure at the two opposite sides of gap 13 splits into three portions: One, which passes completely through the head core and interlinks with the windings (represented by the flux lines *a, b, c*); another one which passses partially through the core and partially through air (represented by the flux lines *d, e, f*) and also interlinks with the signal windings; and a third one (represented by flux line *g*) which does not interlink at all with the signal windings and therefore is lost for signal generation.

It can be seen that the excitation flux located as shown in Fig. 1 intercepts, and therefore effectively modulates, both of the first two portions of the signal flux. The resulting signal voltage will, therefore, be the highest possible under the otherwise given conditions.

This would not be true if the excitation conductor intersects the head at locations other than between the reproducing gap and the respective output coils. For example, in the article entitled "A Magnetic Tape Oscillograph for Power System Analysis," A.I.E.E. Transactions, vol. 70, pp. 1296–1300 (1951), there is disclosed a flux responsive head having an excitation conductor which intersects the head core legs in back of the signal windings, corresponding to locations between the windings 15, 16 and the butt joint 14 in Fig. 1 herein. From the preceding analysis it will be clear that only the first of the three named signal flux portions can be interrupted by the excitation flux induced by the excitation conductor arrangement disclosed in this article, resulting in a substantial loss of the signal voltage.

It is known that flux responsive heads of the modulator type, to prevent signal distortion, require the superimposition of a constant magnetic bias flux upon the variable signal flux. Although other means are known to accomplish the same result, the use of a D.C. bias field has proved to be the simplest approach. The bias field may be generated, for instance, by a D.C. supplied to conductor 20 which extends through the opening of the substantially closed ring core, preferably near the abutting ends of the core legs 11 and 12, as shown in Fig. 1.

Figures 3, 4:
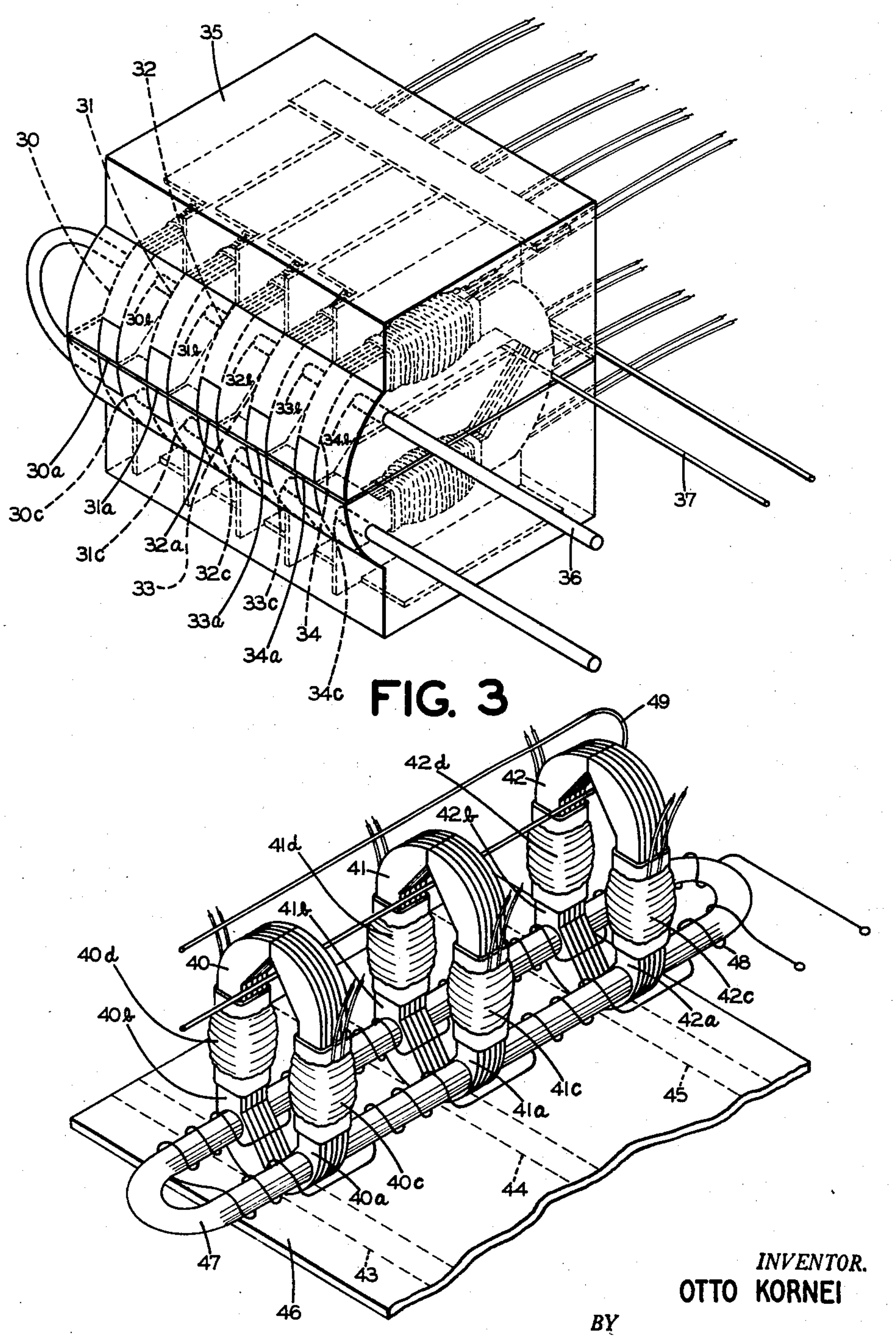
Figure 3 is a perspective view of a preferred embodiment of a multichannel flux responsive magnetic reproducer head unit in accordance with the present invention.
Figure 4 is a schematic perspective view showing a second form of multichannel flux responsive magnetic reproducer head unit in accordance with this invention.

The foregoing embodiment of the present invention is particularly well adapted for incorporation in a multichannel head unit. Thus, as shown in Fig. 3, there may be provided a multichannel head unit of previous design, including a series of closely spaced individual magnetic ring head cores 30, 31, 32, 33, 34 supported in a common housing 35 of plastic or other suitable non-magnetic material. Each magnetic ring head core comprises a pair of opposed confronting core legs arranged similar to the showing in Fig. 1, with each core leg carrying an output coil in spaced relation to the reproducing gap which is located between the confronting pole tips of the core legs. In the illustrated embodiment these individual head cores define a series of reproducing gaps **30*a*, 31*a*, 32*a*, 33*a*, 34*a* which in this instance are in precise alignment across the unit, although such alignment may not be necessary for some applications. An electrical excitation conductor in the form of a wire 36 extends through a first series of aligned holes 30*b*, 31*b*, 32*b*, 33*b*, 34*b* in the individual core legs at one side of the corresponding reproducing gaps, between the reproducing gap and the output coil on each such core leg, and makes a single loop and extends back through a second series of aligned holes 30*c*, 31*c*, 32*c*, 33*c*, 34*c* in the individual core legs at the opposite side of the respective reproducing gaps, between the reproducing gap and the output coil on each such core leg. The excitation conductor 36 intersects each head core leg perpendicular to the direction of the signal flux therein. A suitable excitation signal is applied to the excitation conductor 36** and the current through this conductor induces changing excitation flux in each core leg which periodically substantially magnetically saturates that core leg around the excitation conductor. This excitation flux modulates the steady signal flux induced in each core leg by the recorded signal on the adjacent portion of the record medium which bridges the reproducing gap of that particular head, as in the single channel head of Fig. 1.

It will be evident that only a minor structural change in a multichannel head unit having the conventional mode of operation is required to convert it to flux responsive operation. Thus, all that is required is to provide aligned holes in the core legs at opposite sides of the respective reproducing gaps and a single excitation wire extending through these holes, as shown. D.C. bias may be provided by a single wire 37 extending through the opening surrounded by each head core structure, preferably opposite the reproducing gap, as shown in Fig. 3, this wire being connected across a direct current source.

In both the single channel and multichannel embodiments described above, the single loop excitation wire may be replaced by an arrangement in which an electrical conductor makes a series of loops intersecting the opposite core legs of each head. This would reduce the required amplitude of the excitation current, but would complicate the physical construction and assembly of the head unit.

In Figure 2 there is shown a second embodiment of a single channel flux responsive head in accordance with the present invention. This embodiment comprises a substantially closed magnetic ring core consisting of two opposed confronting high permeability core legs 111 and 112, preferably of non-laminated magnetic ferrite material. At one end the core legs present confronting pole tips which define a narrow reproducing gap 113 positioned to extend contiguous to the record track on the magnetic record medium in use. At their opposite ends the core legs are secured together at a butt joint 114 directly opposite the reproducing gap 113. Output coils 115 and 116 are wound around the respective core legs in spaced relation to the reproducing gap 113.

In accordance with this second embodiment of the invention the core legs are formed with holes 117 and 118, respectively, as shown, each of which is located between the reproducing gap 113 and the output coil on that core leg. Each of these holes extends through the respective core leg from the outer periphery of that core leg into the space surrounded by the ring core. An excitation conductor in the form of a single wire 119 of high electrical conductivity extends through the hole 118 in core leg 112 and makes a single loop back through the hole 117 in core leg 111. The excitation conductor 119 intersects each core leg substantially perpendicular to the direction of the signal flux induced therein by the recorded signal appearing across the reproducing gap 113 of the head. The excitation conductor 119 is connected across a suitable A.C. or interrupted D.C. excitation source having a signal frequency several times that of the highest frequency signal to be reproduced from the magnetic record medium. Each of the holes 117 and 118 is located at a magnetic center in the respective core leg. D.C. bias is provided on the head by means of a conductor 120 extending through the head, as shown, and connected to a D.C. source.

In the operation of this embodiment, excitation current through the excitation conductor 119 induces changing magnetic flux in each core leg around the intersection of the excitation conductor therewith periodically which substantially magnetically saturates the core leg thereat. As a result of the changing excitation flux, the permeability of each core leg around the excitation conductor changes substantially in response to the excitation current. Because of this, the magnetic reluctance of each core leg changes substantially with the excitation signal, thereby causing a corresponding change of any steady signal flux passing through these core legs. Due to this action there is generated in each output coil a voltage having an amplitude proportional to the steady signal flux through the core legs which, in turn, is proportional to the strength of the magnetic signal on the portion of the record medium contiguous to the reproducing gap, and a frequency depending upon the frequency of the excitation signal applied to the excitation conductor.

The perpendicular disposition of the excitation conductor with respect to the signal flux through the core legs of the head and the intersection of the excitation conductor at a magnetic center of each head core leg insure that substantially none of the excitation flux induced in the core legs by the excitation current appears across the reproducing gap to distort or erase the recorded signal on the record medium.

In the above-described embodiments of the invention the excitation conductor is in the form of an electrical conductor to which an electrical excitation signal is applied. The advantageous results of the present invention may also be accomplished by using a magnetic conductor intersecting the core legs so as to induce changing flux therein perpendicular to the signal flux through the core legs. Therefore, it is to be understood that the term "excitation conductor means" in the appended claims, unless otherwise qualified, refers to an electrical excitation conductor or a magnetic excitation conductor.

Referring to Fig. 4, there is shown a multichannel reproducer head unit in accordance with the present invention which has such a magnetic excitation conductor and which embodies certain of the novel principles disclosed in U.S. Patent No. 2,704,789. In this embodiment there are provided a series of individual magnetic reproducing heads 40, 41, 42, each comprising a pair of opposed confronting ring head core legs 40*a* and 40*b*, 41*a* and 41*b*, and 42*a* and 42*b*, respectively. Output coils 40*c* and 40*d*, 41*c* and 41*d*, and 42*c* and 42*d* are wound around the individual core legs in spaced relation to the corresponding reproducing or playback gaps (not shown), which are defined by the confronting pole tips on the core legs. These reproducing gaps extend contiguous to individual signal tracks 43, 44 and 45 on the magnetic record medium 46. The individual heads are supported by a common housing (not shown), preferably in an arrangement generally similar to that shown in Fig. 3.

A closed loop excitation core 47 of high permeability magnetic material intersects the head core legs 40*b*, 41*b* and 42*b* at one side of the respective reproducing gaps of the individual heads, between each reproducing gap and the output coil on the corresponding head core leg, and its return leg intersects the head core legs 42*a*, 41*a* and 40*a* at the opposite side of the respective reproducing gaps, between each reproducing gap and the output coil on the corresponding head core leg. An excitation coil 48 is wound around the several segments of the excitation core and has its terminals connected across a suitable A.C. or interrupted D.C. excitation source, preferably an A.C. source having a frequency several times that of the highest signal frequency to be reproduced from the record medium 46. From Fig. 4 it will be apparent that the excitation core 47 intersects the respective head core legs at right angles to the head core legs and at the intersections has portions of its extent in common with the respective head core legs. D.C. bias is provided by a wire 49 passing through the individual heads opposite the respective reproducing gaps and connected to a suitable D.C. source.

In the operation of this embodiment, when a high frequency A.C. signal is applied to the excitation coil 48 it induces a correspondingly changing magnetic excitation flux through the excitation core 47. The permeability of the excitation core changes with its magnetization, this permeability approaching unity for magnetization approaching saturation. The excitation signal applied to coil 48 causes the excitation core to be substantially magnetically saturated periodically. Since the permeability of the magnetic material of the excitation core 47 changes in the direction perpendicular to the direction of the changing excitation flux through this core, as well as in the direction of the excitation flux, the changing excitation flux through the excitation core 47 substantially changes the permeability of those portions of the excitation core which are in common with the respective head core legs in the direction of the signal flux path through each such head core leg. Because of this, the magnetic reluctance of the core legs of each individual head is changed substantially at twice the A.C. excitation frequency, thereby causing a corresponding change of any steady signal flux passing through this core. This operation generates an output voltage in each output coil even though the record medium is stationary. This output voltage has an amplitude proportional to the steady signal flux passing through the respective head core leg, which, in turn, is proportional to the strength of the magnetic signal on the record channel at the reproducing gap of that particular head. Because of the intersections of the excitation core 47 perpendicular to the core legs, and at magnetic centers of the core legs, substantially none of the excitation flux appears across the reproducing gap of the head to distort the signal output or to erase the recorded signal.

It will be evident that the embodiment of Fig. 4 is adapted for advantageous operation in accordance with the general principles of the present invention because the magnetic conductor 47 intersects each head core leg between the reproducing gap and the respective output coil thereon. Thus, substantially all of the steady signal flux through each head which interlinks with the output coils is interrupted by the excitation flux through the magnetic excitation core 47.

It is to be understood that the principles of the Fig. 4 embodiment may be applied as well to a single channel head unit.

A most important aspect of the present invention is directed to the reproduction of a longitudinally recorded uniform magnetization signal which, because of its uniform magnetization, is of infinitely long recorded wave length, commonly referred to as a "D.C. signal."

Figure 5:
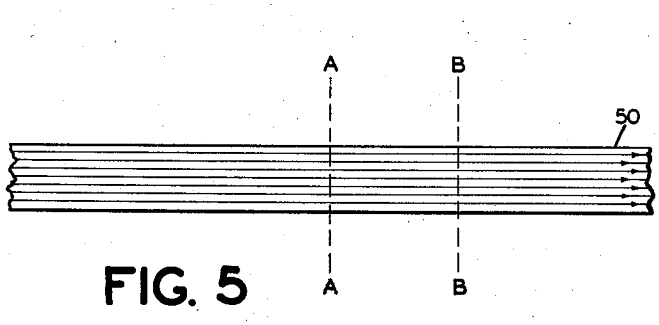
Figure 5 illustrates the magnetic flux lines through a length of magnetizable material which has a uniform remanent magnetization.

Referring to Fig. 5, such a signal recorded magnetically on a magnetizable medium 50 may be represented by a series of substantially parallel magnetic flux lines having the same positive direction. The recorded signal flux density in the magnetizable medium 50 is the same at any location along the length of the recorded signal. Therefore, there is no magnetomotive potential difference in the magnetizable medium between the spaced locations represented by the lines A . . . A and B . . . B. Accordingly, if a flux responsive magnetic reproducer head, whether of the types described above or of any previously known design, is positioned with its reproducing gap bridging the incremental length of the magnetizable medium between the lines A . . . A and B . . . B, or any other points along the signal record trace on the magnetizable medium, there would be no magnetic flux induced in such flux responive reproducer head because there is no magnetomotive potential difference across its recording gap.

However, such a magnetomotive potential difference can be created artificially. For example, referring to Fig. 6, if a mass of high permeability magnetic material 51 is placed contiguous to the magnetizable medium 50 it will distort the pattern of flux lines through the record medium 50, such that some of the flux lines will pass through the magnetic mass 51 and will bypass part of the magnetizable medium 50. As a result, the flux density in the medium 50 at line A. . . .A, at the front edge of the high permeability mass 51, will be less than the flux density at line B . . . B, where the flux pattern is substantially undisturbed by the introduction of the high permeability mass 51. This artificially induced difference in the flux densities in the magnetizable medium 50 results in a magnetomotive potential difference between the locations A . . . A and B . . . B along the medium.

Figure 7:
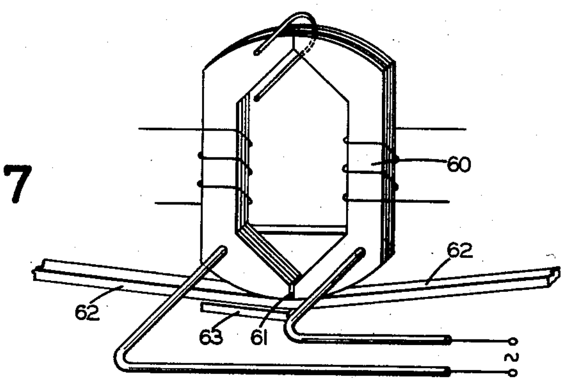
Figure 7 is a schematic perspective view showing a magnetic reproducer head unit in accordance with the present invention for reproducing a uniform magnetization signal which has been longitudinally recorded.

This principle may be applied to a flux responsive head to make such a head capable of reproducing from a magnetic record medium a recorded signal of infinitely long wave length. Thus, referring to Fig. 7, a flux responsive head 60 of the type described in detail above in connection with Fig. 1 is positioned with its reproducing gap 61 contiguous to the magnetic record medium 62. A slug 63 of high permeability magnetic material underlies the record medium, with one of its edges approximately aligned with one of the pole pieces at the reproducing gap of the flux responsive head 60. The presence of the high permeability slug 63 distorts the flux pattern in the record medium and thereby creates an artificial magnetomotive potential gradient across the reproducing gap 61, which induces a steady signal flux in the core of the flux responsive head whose magnitude is proportional to the infinitely long wave length signal trace on the record medium.

It is to be understood that the artificial magnetomotive potential difference created across the reproducing gap of the head in accordance with this invention is of a temporary nature only and in no way alters the permanent magnetic record on the record medium. Thus, this artificially established magnetomotive potential difference affects the reproduction from the record, but not the record itself.

Figure 6:
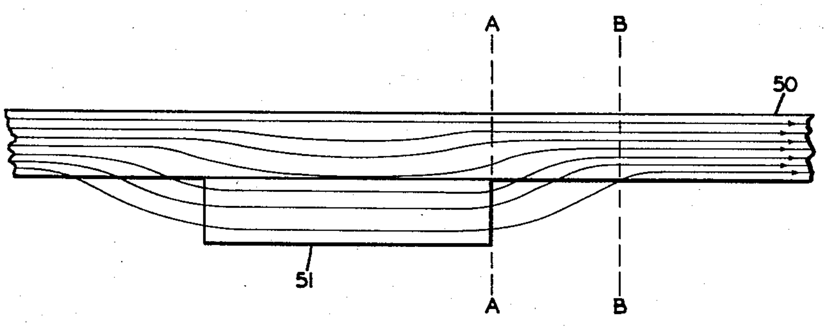
Figure 6 shows the distortion of the magnetic flux in the material resulting from a mass of high permeability material positioned in close proximity to a portion of the length of the magnetizable material.

In actual practice this is not the most effective arrangement for achieving this result but its description here is considered helpful to an understanding of the theoretical basis for this aspect of the present invention. It is to be recognized that in the case of conventional magnetic record tapes the record medium 62 does not consist entirely of magnetizable material, but rather has only a thin surface layer of magnetizable material on a non-magnetic backing, so that the flux distortion effect would not be quite as pronounced as illustrated in Fig. 6.

Figure 8:
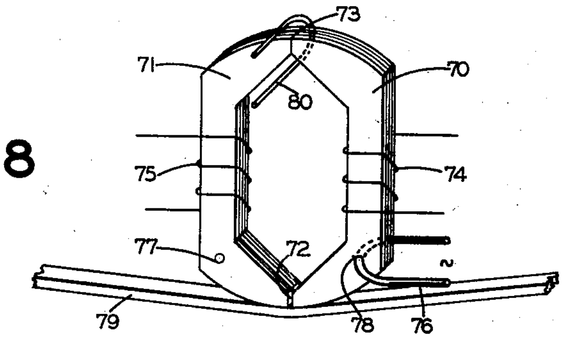
Figure 8 is a similar view showing a preferred embodiment of a magnetic reproducer head for reproducing a longitudinally recorded uniform magnetization signal.

A preferred form of uniform magnetization signal reproducing head in accordance with the present invention is shown in Fig. 8. This head is a structurally simple modification of the flux responsive head shown in Fig. 1. In this embodiment the head comprises a substantially closed magnetic ring core consisting of two opposed confronting core legs 70, 71 of high permeability magnetic material which at their confronting pole tips at one end define a reproducing gap 72. Preferably, this gap is filled with non-magnetic material, such as aluminum or bronze foil. In a typical case the gap length may be about .004 inch. At their opposite ends the core legs 70 and 71 are secured together at a butt joint 73. The respective core legs carry output coils 74 and 75, respectively, which are wound around the core legs in spaced relation to the reproducing gap 72.

For the purpose of establishing an artificial magnetomotive potential difference across the recording gap, there is provided an electrical excitation conductor 76 which intersects the head core leg 70 only, this intersection being located between the reproducing gap 72 and output coil 74 on that core leg. In this instance, the excitation conductor 76 intersects the head core leg 70 perpendicular thereto (that is, the length of conductor 76 extends perpendicular to a longitudinal plane through the head core leg 70), as in the Fig. 1 head. However, if desired, the excitation conductor may intersect the head core leg as in the Fig. 2 embodiment. The terminals of the excitation conductor are connected to a suitable A.C. or interrupted D.C. excitation source. The other core leg 71 may or may not, as desired, be provided with a hole 77 located similarly to the hole 78 in the core leg 70 at which the excitation conductor 76 intersects this core leg. The intersection of the excitation conductor 76 with the core leg 70 should be at substantially a magnetic center of this core leg. D.C. bias is provided by a conductor 80 passing through the ring head core adjacent the butt joint 73.

In the operation of this head, the excitation current through the excitation conductor 76 induces about this conductor changing excitation flux in the core leg 70 between the reproducing gap 72 and the output coil 74 on this core leg. This excitation flux periodically substantially magnetically saturates the core leg 70 around the intersection of the excitation conductor 76 therewith. As a result of the changing excitation flux so induced in this portion of core leg 70, the permeability of this core leg between the reproducing gap 72 and its output coil 74 changes substantially in response to the excitation signal. This action does not take place in the other core leg 71 because the excitation conductor does not intersect it. Consequently, the permeability of this other core leg 71 does not change in response to the excitation signal and thus there is established a magnetic asymmetry in the head at opposite sides of the reproducing gap. This magnetic asymmetry results in an artificial flux distortion of the contiguous record medium and the creation of a consequent artificial magnetomotive potential gradient across the reproducing gap 72 even though the reproducing gap is contiguous to an infinitely long wave length, or uniform magnetization signal trace on the record medium 79, which in the absence of this asymmetry in the reproducing head would not induce any signal flux in the reproducer head.

It will be apparent that this embodiment represents an extremely simple structural modification of the flux responsive head of Fig. 1, since the only change is in passing the excitation conductor 76 through only one of the core legs and not the other.

Figure 9:
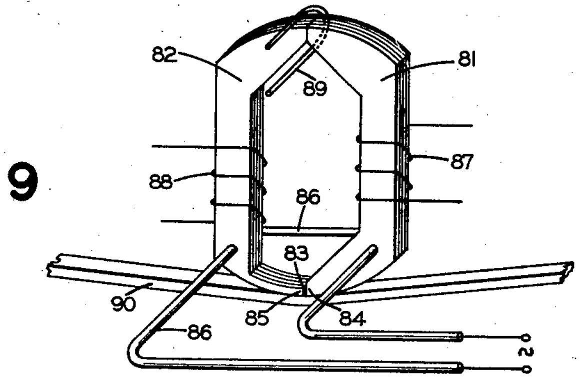
Figure 9 is a similar view showing a third embodiment of a magnetic reproducer head for this purpose.

Figure 9 shows a further embodiment of the present invention which operates on the general principle of establishing an artificial magnetomotive potential gradient across the reproducing gap of the head by providing a magnetic asymmetry or dissimilarity in the head at opposite sides of the reproducing gap.

In this embodiment the head comprises a pair of opposed confronting magnetic core legs 81 and 82 which define a reproducing gap 83 at their confronting pole tips 84 and 85. The core legs are secured together at their opposite ends to provide a substantially closed magnetic ring core. At their confronting pole tips 84 and 85 the respective core legs are radically dissimilar in size and shape, as indicated in Fig. 9. An electrical excitation conductor 86 intersects each of the core legs between the reproducing gap and the respective output coil 87 or 88 thereon. The excitation conductor 86 intersects each of the head core legs perpendicular to the head core legs. D.C. bias is provided by a conductor 89 passing through the opening enclosed by the core legs 81, 82 and preferably located adjacent the abutting ends of these core legs, as shown in Fig. 8.

When an excitation signal is applied across the opposite terminals of the excitation conductor 86, the current through this conductor induces changing excitation flux in each of the core legs 81 and 82 between the reproducing gap 83 and the respective output coils 87 and 88. This excitation flux periodically substantially magnetically saturates the core legs 81, 82 around the respective intersections of the excitation conductor 86 therewith. Because of the dissimilarity between the confronting pole tips 84 and 85 at the reproducing gap, the flux densities in these pole tips are appreciably different, thereby establishing an artificial magnetomotive potential difference across the recording gap 83. When the reproducing gap 83 is positioned contiguous to a signal trace of infinitely long wave length on the magnetic record medium 90, there is induced in the output coils 87 and 88 a voltage proportional to the strength of the signal trace appearing across the reproducing gap, due to the magnetic dissimilarity of the confronting pole tips at opposite sides of the reproducing gap 83.

If desired, this magnetic dissimilarity may be established by making the confronting pole tips of materials having different magnetic characteristics.

It is to be understood that the principles of the aspect of the present invention which relates to reproducing a recorded signal of infinitely long wave length are not limited to the particular flux responsive heads shown herein. Any flux responsive head of suitable sensitivity can be made capable of reproducing a magnetically recorded signal of infinitely long wave length by establishing an artificial magnetomotive potential difference across its reproducing gap by rendering the core legs of such head magnetically dissimilar, preferably in the immediate vicinity of the reproducing gap. Further, it is to be recognized that each of these embodiments may be modified by substituting a magnetic excitation conductor in place of the electrical excitation conductor arrangements shown without departing from the principles of this invention.

Figure 10:
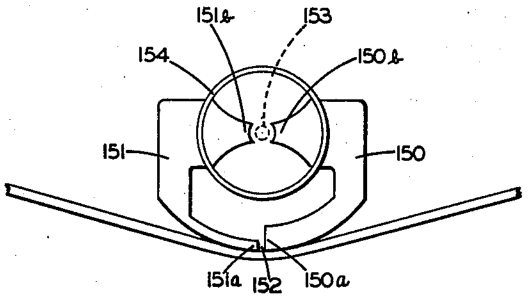
Figure 10 is a schematic illustration of a fourth form of magnetic reproducer head for this purpose.

As an example of another type of magnetic reproducer head arrangement to which the principles of the present invention may be applied, an electron beam head of a type generally similar to that disclosed in U.S. Patent 2,165,307 to A. M. Skellett is illustrated schematically in Fig. 10. This head includes a magnetic core comprising a pair of core legs 150 and 151 which present opposed confronting pole tips 150*a* and 151*a* defining a reproducing gap 152. These confronting pole tips are radically different in size and shape, as in the Fig. 9 embodiment. At their opposite ends the core legs 150 and 151 present shaped pole pieces **150*b* and 151*b* disposed on opposite sides of the electron beam 153** in a cathode ray tube. Suitable electrodes (not shown) are provided in the cathode ray tube for establishing a focused electron beam flowing perpendicular to the plane of Fig. 10 toward a suitable target arrangement (not shown).

In the operation of this device, the signal flux path through the head includes the gap between the pole pieces **150*b* and 151*b*** through which the electron beam passes. Thus, the beam is deflected in accordance with the intensity of the reproduced magnetic signal.

While there have been described herein and illustrated in the accompanying drawings several preferred embodiments of the present invention, it is to be understood that various modifications, omissions and refinements which depart from the disclosed embodiments may be adopted without departing from the spirit and scope of this invention. For example, in each embodiment the head core may be of essentially electrically non-conductive magnetic materials, such as ferrite particularly where the signals to be reproduced or the exciter current are of relatively high frequency. Also, the above-described heads for reproducing uniform magnetization signals may be incorporated in multichannel magnetic head units.

This application is a continuation-in-part of my copending application Serial No. 471,451, filed Nov. 26, 1954.

I claim:

1. A flux responsive magnetic reproducer head for reproducing a signal recorded magnetically on a magnetic record medium, said reproducer head comprising a substantially closed magnetic core having a reproducing gap to be positioned adjacent the record medium to have magnetic signal flux induced in the core by the recorded signal on the adjacent portion of the record medium, output signal means coupled to said core in spaced relation to said gap to produce an output signal in response to the signal flux in the core, excitation means intersecting the core between said gap and said output signal means at a location disposed within the path of the major portion of the signal flux in the core, a power source coupled to said excitation means for periodically energizing said excitation means during reproduction to periodically substantially saturate the core at the intersection of said excitation means therewith, and means independent of said excitation means for establishing in one direction only of said magnetic core magnetic flux which is superimposed on the magnetic flux established by said excitation means.

2. A flux responsive magnetic reproducer head for reproducing a signal recorded magnetically on a magnetic record medium, said reproducer head comprising a substantially closed magnetic core having a reproducing gap to be positioned adjacent the record medium to have magnetic signal flux induced in the core by the recorded signal on the adjacent portion of the record medium, output coil means wound around the core in spaced relation to the gap, excitation conductor means intersecting the core between the gap and said output coil means at a location disposed within the path of the major portion of the signal flux in the core, said excitation conductor means having provision for being periodically energized during reproduction independently of said output coil means to induce changing excitation flux in the core which periodically substantially saturates the core at the intersection of said excitation conductor means therewith, and means independent of said excitation conductor means for establishing in one direction only of said magnetic core magnetic flux which is superimposed on the magnetic flux established by said excitation means.

3. A flux responsive magnetic reproducer head for reproducing a signal recorded magnetically on a magnetic record medium, said reproducer head comprising a substantially closed magnetic core having a reproducing gap to be positioned adjacent the record medium and across which the recorded signal on the adjacent portion of the record medium induces magnetic signal flux which flows in the core from one side of said gap to the other side of said gap, output coil means wound around the core in spaced relation to said reproducing gap, excitation conductor means intersecting the core between said reproducing gap and said output coil means at a location disposed within the path of the major portion of the signal flux in the core, a power source for energizing said excitation conductor means periodically during reproduction to induce changing excitation flux which periodically substantially saturates the core at the intersection of said excitation conductor means with the core, and means independent of said excitation conductor means for establishing in one direction only of said magnetic core magnetic flux which is superimposed on the magnetic flux established by said excitation means.

4. A flux responsive magnetic reproducer head for reproducing a signal recorded magnetically on a magnetic record medium, said reproducer head comprising a substantially closed magnetic core having a reproducing gap to be positioned adjacent the record medium to have magnetic signal flux induced in the core by the recorded signal on the adjacent portion of the record medium, an output signal coil wound around the core in spaced relation to said gap, excitation conductor means intersecting the core between said gap and said output signal coil at a location disposed within the path of the major portion of the signal flux in the core, a power source coupled to said excitation conductor means for periodically energizing said excitation conductor means during reproduction to produce changing excitation flux which periodically substantially magnetically saturates the core at the intersection of said excitation conductor means therewith, and means independent of said excitation conductor means for establishing in one direction only of said magnetic core magnetic flux which is superimposed on the magnetic flux established by said excitation means.

5. The magnetic reproducer head of claim 4, wherein said excitation conductor means is in the form of electrical conductor means extending through the core, and said power source is an electrical power source which passes changing electric current through said electrical conductor means to induce changing excitation flux in the core around the intersection of said electrical conductor means therewith.

6. The magnetic reproducer head of claim 5, wherein said electrical conductor means intersects the core at substantially a magnetic center thereof.

7. The magnetic reproducer head of claim 4, wherein said excitation conductor means is in the form of magnetic conductor means and wherein there is provided excitation coil means inductively coupled to said magnetic conductor means, and wherein said power source is an electrical power source coupled to said excitation coil means to pass changing electric current through said excitation coil means to induce changing magnetic flux in said magnetic conductor means.

8. A flux responsive magnetic reproducer head for reproducing a signal recorded magnetically on a magnetic record medium, said reproducer head comprising a pair of opposed confronting magnetic core legs forming a substantially closed magnetic ring core and having confronting pole tips which define a reproducing gap to be positioned adjacent the record medium to have magnetic signal flux induced in the core legs by the recorded signal on the adjacent portion of the record medium, output coils wound around the respective core legs in spaced relation to the reproducing gap, excitation conductor means extending through one of said core legs between said gap and the output coil on said core leg at a location disposed within the path of the major portion of the signal flux in said core leg, said excitation conductor means extending back through the other core leg between said gap and the output coil on said other core leg at a location disposed within the path of the major portion of the signal flux in said other core leg, a power source coupled to said excitation conductor means and operative to periodically energize said excitation conductor means to periodically substantially saturate each core leg at the intersection of said excitation conductor means therewith, and means independent of said excitation conductor means for establishing in one direction only of said magnetic core magnetic flux which is superimposed on the magnetic flux established by said excitation means.

9. The magnetic reproducer head of claim 8, wherein said excitation conductor means is in the form of electrical conductor means which intersects each core leg at substantially a magnetic center thereof, and said power source is an electrical power source which passes changing electric current through said electrical conductor means to induce changing magnetic flux in each core leg around the intersection of said electrical conductor means therewith.

10. A multichannel flux responsive magnetic reproducer head unit for reproducing signals recorded magnetically at different signal tracks on a record medium, said head unit comprising a plurality of substantially closed magnetic ring cores each having opposed core legs which present confronting pole tips defining a reproducing gap to be positioned adjacent a respective signal track on the record medium to have magnetic signal flux induced in the core legs by the recorded signal on the corresponding record track, means supporting said ring head cores in side-by-side relationship, output coils wound around the individual core legs of each ring head core in spaced relation to the corresponding reproducing gaps, excitation conductor means extending through the core legs at one side of the reproducing gaps and extending back through the core legs at the other side of the reproducing gaps, said excitation conductor means intersecting each core leg at a location disposed within the path of the major portion of the signal flux in said core leg, and power source coupled to said excitation conductor means for periodically energizing said excitation conductor means to periodically substantially saturate each core leg at the intersection of said excitation conductor means therewith.

11. The magnetic reproducer head unit of claim 10, wherein said excitation conductor means is in the form of a single electrical conductor which extends through the core legs at one side of the reproducing gaps and makes a loop and extends back through the core legs at the other side of the reproducing gaps, and said power source is an electrical power source which passes changing electric current through said electrical conductor to induce changing magnetic flux in each core leg around the intersection of said electrical conductor therewith.

12. The magnetic reproducer head unit of claim 11, wherein said electrical conductor intersects each core leg substantially perpendicular to the direction of the signal flux therein at substantially a magnetic center thereof.

13. A magnetic reproducer head comprising a magnetic ring core having a reproducing gap, output coil means on said ring core in spaced relation to said reproducing gap, means for varying periodically the magnetic reluctance of said ring core to produce across said output coil means a voltage substantially proportional to the magnitude of the magnetic flux through the ring core, and said ring core being substantially dissimilar magnetically on opposite sides of said reproducing gap.

14. A magnetic reproducer head comprising a pair of opposed confronting magnetic core legs forming a substantially closed magnetic ring core and defining a reproducing gap, output coils wound around the respective core legs in spaced relation to the reproducing gap, means for varying periodically the magnetic reluctance of said ring core to produce across said output coils an output signal voltage substantially proportional to the magnitude of the magnetic flux through the ring core, and said core legs between the reproducing gap and the respective output coils being substantially dissimilar magnetically.

15. The magnetic reproducer head of claim 14, wherein there is provided an excitation conductor intersecting each core leg at substantially a magnetic center thereof at a location between the reproducing gap and the output coil on that core leg for varying the magnetic reluctance of each core leg in response to an excitation signal applied to the excitation conductor, and wherein said core legs present confronting pole tips at opposite sides of the reproducing gap which are substantially different in cross-section to thereby establish the magnetic dissimilarity of the ring core at opposite sides of the reproducing gap.

16. A flux responsive magnetic reproducer head for reproducing a signal recorded magnetically on a record medium, said reproducer head comprising a magnetic core having a reproducing gap to be positioned adjacent the record medium to have magnetic signal flux induced in the core by the recorded signal on the adjacent portion of the record medium, means coupled to the core for producing an output signal substantially proportional to the signal flux in the core, an electrical excitation conductor intersecting the core at each side of the reproducing gap, an electrical power source coupled to said excitation conductor to apply changing current thereto for periodically substantially saturating the core at the respective intersections of said excitation conductor therewith, and said core being substantially dissimilar magnetically on opposite sides of the reproducing gap.

17. The magnetic reproducer head of claim 16, wherein said core presents confronting pole tips at opposite sides of the reproducing gap which are substantially different in cross-section to thereby provide the magnetic dissimilarity of the core on opposite sides of the reproducing gap.

18. A flux responsive magnetic reproducer head for reproducing a signal recorded magnetically on a record medium, said reproducer head comprising a substantially closed magnetic ring core having opposed core legs which present confronting pole tips defining a reproducing gap to be positioned adjacent the record medium to have magnetic signal flux induced in the core legs by the recorded signal on the adjacent portion of the record medium, output coils wound around the respective core legs in spaced relation to the reproducing gap, an electrical excitation conductor extending through each core leg at a location disposed within the path of the major portion of the signal flux in that core leg, an electrical power source coupled to said excitation conductor for passing changing current through said excitation conductor to periodically saturate said core leg around the intersection of the excitation conductor therewith, and said pole tips at the opposite sides of the reproducing gap being substantially different in cross-section to thereby render the core substantially dissimilar magnetically on opposite sides of the reproducing gap.

19. The magnetic reproducer head of claim 18, wherein said excitation conductor intersects each core leg substantially perpendicular to the direction of the signal flux therein at substantially a magnetic center of said core leg.

20. A flux responsive magnetic reproducer head for reproducing a signal recorded magnetically on a record medium, said reproducer head comprising a substantially closed magnetic core having a reproducing gap to be positioned adjacent the record medium to have magnetic signal flux induced in the core by the recorded signal on the adjacent portion of the record medium, means coupled to the core for producing an output signal substantially proportional to the signal flux in the core, excitation conductor means intersecting the core at one side of the reproducing gap, and a power source coupled to said excitation conductor means to apply a changing excitation signal thereto for periodically substantially saturating the core at the intersection of said excitation conductor means therewith to thereby render the core substantially dissimilar magnetically on opposite sides of the reproducing gap.

21. A flux responsive magnetic reproducer head comprising a magnetic core having a reproducing gap, means including coil means and excitation means coupled to said core for producing across said coil means an output signal substantially proportional to the recorded signal flux appearing across the reproducing gap, said core having opposed confronting pole tips at opposite sides of said reproducing gap which are substantially different in cross section.

References Cited in the file of this patent

UNITED STATES PATENTS

| | | |
|---|---|---|
| 2,615,097 | Camras | Oct. 21, 1952 |
| 2,649,568 | Felch et al. | Aug. 18, 1953 |
| 2,722,569 | Loper | Nov. 1, 1955 |
| 2,768,243 | Hare | Oct. 23, 1956 |
| 2,785,233 | Stuart | Mar. 12, 1957 |

FOREIGN PATENTS

| | | |
|---|---|---|
| 504,932 | Great Britain | Apr. 28, 1939 |